United States Patent
Sumi et al.

(10) Patent No.: US 10,131,352 B2
(45) Date of Patent: Nov. 20, 2018

(54) IN-VEHICLE ELECTRIC MOTOR CONTROL DEVICE

(71) Applicant: DENSO CORPORATION, Kariya, Aichi-pref. (JP)

(72) Inventors: Tomoyuki Sumi, Kariya (JP); Koji Sakai, Kariya (JP); Yuuji Kamiya, Kariya (JP); Hideyuki Morita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/541,259

(22) PCT Filed: Jan. 21, 2016

(86) PCT No.: PCT/JP2016/000284
§ 371 (c)(1),
(2) Date: Jun. 30, 2017

(87) PCT Pub. No.: WO2016/125438
PCT Pub. Date: Aug. 11, 2016

(65) Prior Publication Data
US 2017/0369061 A1    Dec. 28, 2017

(30) Foreign Application Priority Data

Feb. 4, 2015  (JP) ................................. 2015-020163

(51) Int. Cl.
*B60W 30/14* (2006.01)
*F04B 49/06* (2006.01)
(Continued)

(52) U.S. Cl.
CPC ............. *B60W 30/146* (2013.01); *B60L 1/00* (2013.01); *F04B 49/06* (2013.01); *F04B 49/065* (2013.01);
(Continued)

(58) Field of Classification Search
CPC ............................. B60W 30/146; H02P 29/00
See application file for complete search history.

(56) References Cited

U.S. PATENT DOCUMENTS

2001/0032044 A1* 10/2001 Hanawa .............. F16H 61/0213
                                                      701/51
2010/0049387 A1*  2/2010 Aoki ...................... B60K 6/365
                                                      701/22
(Continued)

FOREIGN PATENT DOCUMENTS

JP       2005344647 A    12/2005
JP       2009148055 A     7/2009

*Primary Examiner* — Muhammad S Islam
(74) *Attorney, Agent, or Firm* — Harness, Dickey & Pierce, P.L.C.

(57) ABSTRACT

A CPU drives an inverter based on a command rotation speed that is inputted from a higher level ECU at a predetermined update interval. The CPU acquires an actual rotation speed of the electric motor, and calculates an accelerated rate and a decelerated rate based on the update interval and a difference between the actual rotation speed and the command rotation speed such that the actual rotation speed changes without reaching the command rotation speed and becoming constant before an end of the update interval. The CPU drives the inverter such that the electric motor rotates at the calculated rate.

6 Claims, 7 Drawing Sheets

(51) Int. Cl.
*B60L 1/00* (2006.01)
*H02P 23/14* (2006.01)
*H02P 29/00* (2016.01)
*H02P 27/06* (2006.01)

(52) U.S. Cl.
CPC .............. *H02P 23/14* (2013.01); *H02P 29/00* (2013.01); *H02P 27/06* (2013.01); *H02P 2205/07* (2013.01)

(56) References Cited

U.S. PATENT DOCUMENTS

| | | | | |
|---|---|---|---|---|
| 2012/0265387 | A1* | 10/2012 | Hisada | B60K 6/383 |
| | | | | 701/22 |
| 2012/0310460 | A1* | 12/2012 | Sato | B60K 6/445 |
| | | | | 701/22 |
| 2013/0012353 | A1* | 1/2013 | Yoshida | B60K 6/48 |
| | | | | 477/5 |
| 2014/0045649 | A1* | 2/2014 | Yoshida | B60K 6/48 |
| | | | | 477/5 |
| 2014/0297142 | A1* | 10/2014 | Kojima | F16H 61/66259 |
| | | | | 701/58 |
| 2015/0167617 | A1* | 6/2015 | Fujita | F02N 11/0859 |
| | | | | 701/113 |

\* cited by examiner

IN-VEHICLE ELECTRIC MOTOR CONTROL DEVICE

CROSS REFERENCE TO RELATED APPLICATIONS

This application is a U.S. National Phase Application under 35 U.S.C. 371 of International Application No. PCT/JP2016/000284 filed on Jan. 21, 2016 and published in Japanese as WO 2016/125438 A1 on Aug. 11, 2016. This application is based on and claims the benefit of priority from Japanese Patent Application No. 2015-020163 filed on Feb. 4, 2015. The entire disclosures of all of the above applications are incorporated herein by reference.

TECHNICAL FIELD

The present disclosure relates to an in-vehicle electric motor control device.

BACKGROUND ART

Conventionally, a configuration which measures an input current to an in-vehicle electric motor and changes a rotation speed of the electric motor based on the measurement result has been proposed by, for example, Patent Document 1. In general, an inverter receives a command rotation speed from a higher level ECU and operates to control an actual rotation speed to follow the command rotation speed.

The higher level ECU and the inverter communicate with each other by an arbitrary communication protocol. The command rotation speed is updated at a regular interval. The electric motor stores a constant accelerated rate. The electric motor accelerates its rotation speed with the accelerated rate for every update of the command rotation speed, and terminates the acceleration when the actual rotation speed reaches the command rotation speed. Accordingly, the operation of the electric motor becomes constant-speed rotation.

When the update interval of the command rotation speed is set at 1 second, for example, and a variation width of the command rotation speed is an increment less than the constant accelerated rate, the acceleration of the electric motor is terminated during the update interval. Thus, the electric motor continues to rotate at the constant speed until next update of the command rotation speed. When the increment of the command rotation speed which is less than the constant accelerated rate occurs every 1 second successively, the operation of the electric motor alternates between the acceleration and the constant-speed rotation. As a result, a noise like a musical scale may be generated from the electric motor and provide a user with a feeling of strangeness.

Similarly, when the electric motor is decelerated, the operation of the electric motor alternates between deceleration and constant-speed rotation. Hence, a noise similar to the above-described noise may generate also when the electric motor is decelerated.

PRIOR ART DOCUMENT

Patent Document

Patent Document 1: JP 2005-344647 A

SUMMARY

In consideration of the above-described points, it is an objective of the present disclosure to provide an in-vehicle electric motor control device capable of preventing generation of noise caused by alternation of acceleration or deceleration and constant-speed rotation of an electric motor.

According to an aspect of the present disclosure, an in-vehicle electric control device includes a controller acquiring a calculated command rotation speed from an external device at a predetermined update interval, and rotating an electric motor by driving an inverter based on the command rotation speed. The controller calculates a rate of change of a rotation speed of the electric motor, and drives the inverter to rotate the electric motor at the rate of change. The controller acquires an actual rotation speed of the electric motor, and calculates the rate of change based on the update interval and a difference between the actual rotation speed and the command rotation speed such that the actual rotation speed reaches the command rotation speed at an end of each update interval.

According to another aspect of the present disclosure, an in-vehicle electric control device includes a controller acquiring a calculated command rotation speed from an external device at a predetermined update interval, and rotating an electric motor by driving an inverter based on the command rotation speed. The controller calculates a rate of change of a rotation speed of the electric motor, and drives the inverter to rotate the electric motor at the rate of change. The rate of change is a parameter representing increase or decrease in the number of rotations during a predetermined period. The controller acquires an actual rotation speed of the electric motor, and calculates the rate of change based on the update interval and a difference between the actual rotation speed and the command rotation speed such that the actual rotation speed changes without reaching the command rotation speed and becoming constant before an end of each update interval.

Accordingly, the actual rotation speed of the electric motor continuously changes at the rate of change calculated by the controller until next update of the command rotation speed. In other words, the actual rotation speed of the electric motor does not reach the command rotation speed before an end of each update interval. Thus, alternation of acceleration or deceleration and constant-speed rotation of the electric motor does not occur in successive update intervals.

Therefore, generation of noise like a music scale caused by rotation of the electric motor can be prevented.

DESCRIPTION OF EMBODIMENTS

Figure 1:
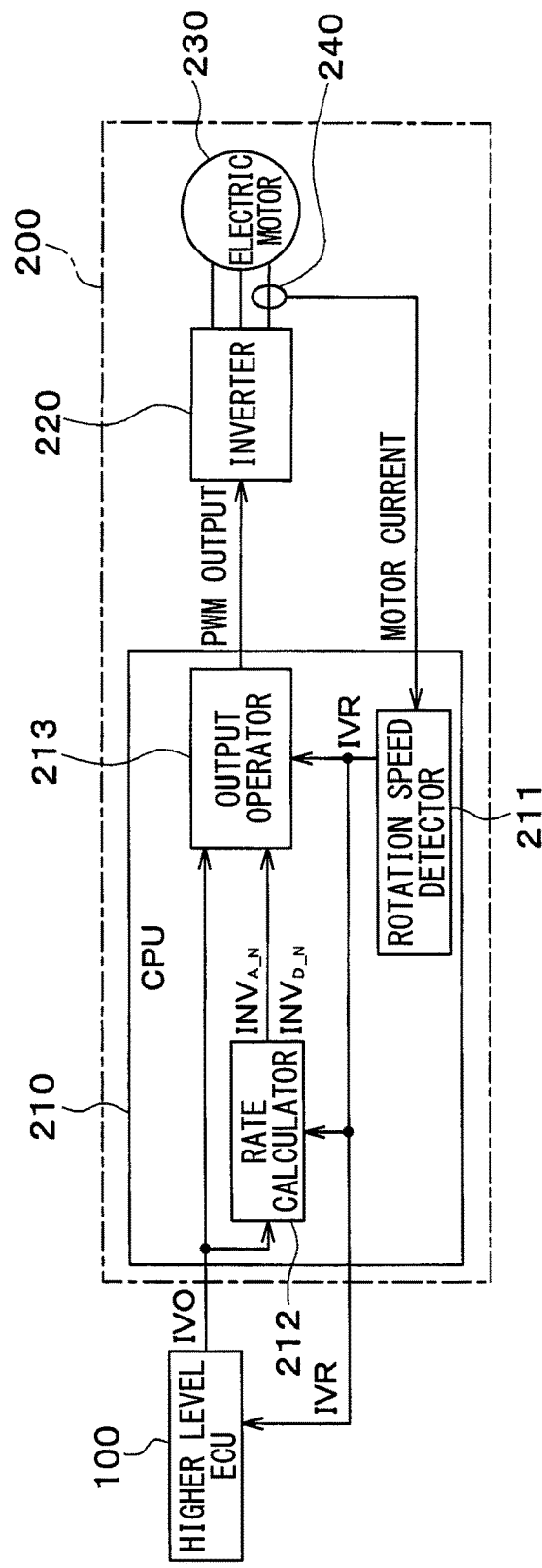
FIG. 1 is a diagram showing a system including an in-vehicle electric motor control device according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Hereinafter, a first embodiment of the present disclosure will be described referring to the drawings. An in-vehicle electric motor control device according to the present embodiment is applied to a control of an in-vehicle electric compressor used for air conditioning in a vehicle compartment.

As shown in FIG. 1, a system according to the present embodiment includes a higher level ECU 100 (Electrical Control Unit: ECU) and an electric motor control device 200. In FIG. 1, a power source system is omitted.

The higher level ECU 100 is an ECU such as an engine ECU or an air-conditioning ECU mounted on a vehicle. The higher-level ECU 100 communicates with the electric motor control device 200 through a communication line by a communication protocol such as CAN, LIN or PWM. Therefore, the higher level ECU 100 sends and receives necessary information for an engine control or an air-conditioning control at a predetermined regular update interval ($IVO_{INT}$). The update interval may be equal to a communication interval between the higher level ECU 100 and the electric motor control device 200, or may be different from the communication interval.

The electric motor control device 200 includes a CPU 210, an inverter 220 and an electric motor 230. The CPU 210 constitutes a microcomputer together with a non-shown memory and others.

The CPU 210 is a circuit which operates the inverter 220 by a request or a command from the higher level ECU 100. The CPU 210 includes a rotation speed detector 211, a rate calculator 212 and an output operator 213.

The rotation speed detector 211 has a function to detect an actual rotation speed (IVR) which is an actual rotation rate of the electric motor 230. In the present embodiment, the rotation speed detector 211 acquires a motor current from a current sensor 240 which detects a current supplied from the inverter 220 to the electric motor 230. The rotation speed detector 211 detects a rotation speed of the electric motor 230 based on change of the motor current. The rotation speed detector 211 outputs information of the acquired actual rotation speed (IVR) to the rate calculator 212, the output operator 213 and the higher level ECU 100. The rotation speed detector 211 may acquire a positional signal from a non-shown position sensor provided in the electric motor 230, and may detect the rotation speed of the electric motor 230 based on the positional signal.

The CPU 210 transmits the actual rotation speed of the electric motor 230 to the higher level ECU 100 every time the rotation speed detector 211 acquires the actual rotation speed. The higher level ECU 100 executes an engine control or an air-conditioning control based on the actual rotation speed of the electric motor 230.

The rate calculator 212 has a function to calculate a rate of change of the rotation of the electric motor 230, i.e. an accelerated rate ($INV_{A\_N}$) or a decelerated rate ($INV_{D\_N}$), based on a command rotation speed ($IVO_N$) inputted from the higher level ECU 100 at a predetermined update interval. The "rate of change" is a parameter which represents, for example, increase or decrease in the number of rotations per second. The "N" of the command rotation speed ($IVO_N$), the accelerated rate ($INV_{A\_N}$) and the decelerated rate ($INV_{D\_N}$) means that these values are updated at each update interval.

The rate calculator 212 holds information of the update interval in advance. When the rate calculator 212 does not hold the information of the update interval, the higher level ECU 100 may outputs the information of the update interval to the rate calculator 212 at an activation time of the system.

More specifically, the rate calculator 212 acquires the actual rotation speed of the electric motor 230 from the rotation speed detector 211 while acquiring the command rotation speed ($IVO_N$) from the higher level ECU 100. The rate calculator 212 calculates the accelerated rate or the decelerated rate, at which the actual rotation speed reaches the command rotation speed at an end of the update interval, based on the update interval and a difference between the actual rotation speed and the command rotation speed of the electric motor 230.

The output operator 213 has a function to output a PWM signal to the inverter 220 such that the electric motor 230 rotates at the accelerated rate or the decelerated rate which is calculated by the rate calculator 212 in each update interval. More specifically, the output operator 213 outputs a control signal to non-shown six switching elements of the inverter 220, thereby driving the respective switching elements. Accordingly, the electric motor 230 rotates.

The inverter 220 is a circuit configured to convert a direct-current voltage of a non-shown high-voltage battery to an alternating-current voltage and drive the electric motor 230 by generating alternating currents and alternating-current voltages having three phases: U-phase, V-phase and W-phase. The inverter 220 includes a U-phase arm, a V-phase arm and a W-phase arm, and each arm includes two switching elements that are connected in series. An intermediate point of each arm is connected to each phase end of each phase coil of the electric motor 230.

The electric motor 230 has a configuration where ends of three coils of U-phase, V-phase and W-phase are interconnected at a midpoint. The electric motor 230 is operated based on three-phase electricity supplied from the inverter 220. The electric motor 230 is coupled to a compression mechanism through a non-shown coupling mechanism. For example, the compression mechanism is driven by the electric motor 230 to compress a refrigerant. Described above is a configuration of an overall system including the in-vehicle electric motor control device 200 according to the present embodiment.

Figure 2:
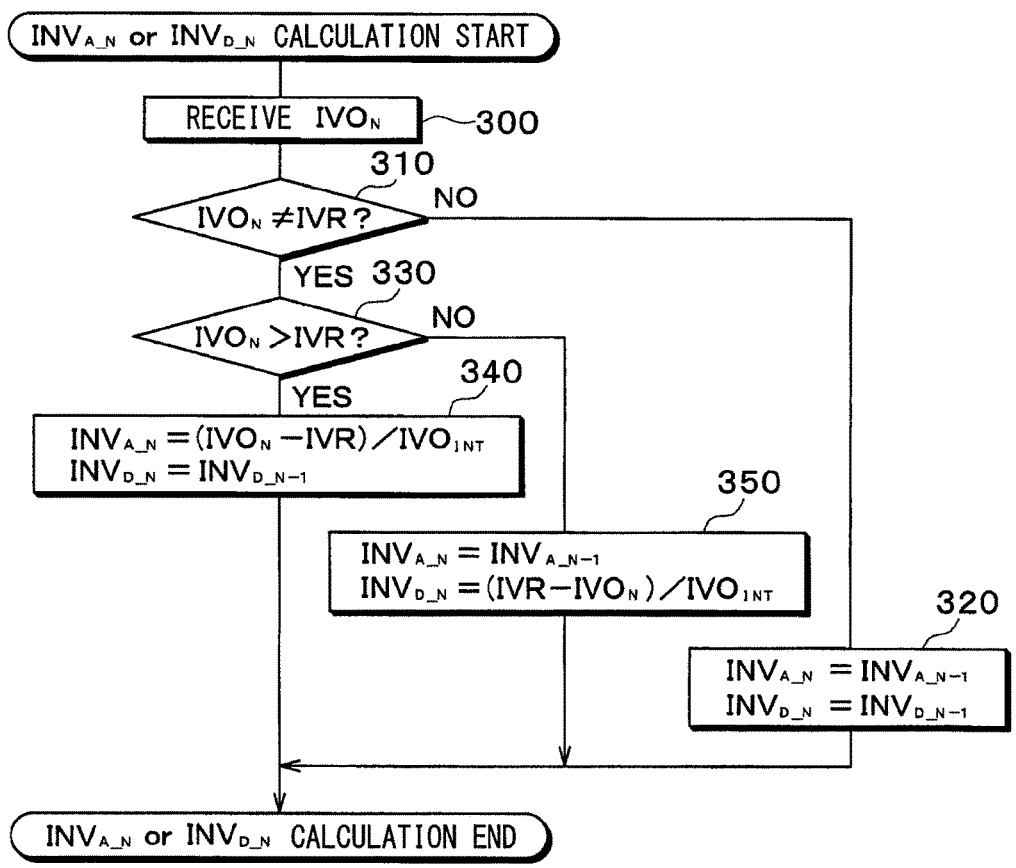
FIG. 2 is a flowchart showing a process for a CPU calculating an accelerated rate and a decelerated rate, according to the first embodiment.

Next, an operation of the in-vehicle electric motor control device 200 will be described. The CPU 210 of the in-vehicle electric motor control device 200 executes a control of the inverter 220 in accordance with a control process shown in FIG. 2. The flowchart shown in FIG. 2 starts when an electric source is supplied to the CPU 210, and then repeats at the update interval.

The CPU 210 receives the command rotation speed (IVO$_N$) of the electric motor 230 from the higher level ECU 100 for use in a next update interval (step 300). At this point, N=1.

Subsequently, the CPU 210 determines whether the command rotation speed (IVO$_N$) is different from the actual rotation speed (IVR) (step 310). Since the actual rotation speed (IVR) acquired by the rotation speed detector 211 continuously changes, it is determined whether the actual rotation speed (IVR) is out of a predetermined range including the command rotation speed (IVO$_N$). The CPU 210 performs the determination by using the actual rotation speed (IVR) which has been obtained from the rotation speed detector 211 before the determination.

When the command rotation speed (IVO$_N$) is not different from the actual rotation speed (IVR), i.e. the actual rotation speed (IVR) is fallen within the predetermined range including the command rotation speed (IVO$_N$), the electric motor 230 is rotated at constant speed. In this case, neither acceleration nor deceleration is performed. Thus, the CPU 210 sets the accelerated rate (INV$_{A\_N}$) and the decelerated rate (INV$_{D\_N}$) at the present time (N=1) to be the same value as the accelerated rate (INV$_{A\_N-1}$) and the decelerated rate (INV$_{D\_N-1}$) of the last time (N=0) (step 320). Then, the calculation of the accelerated rate and the decelerated rate at the present time (N=1) is terminated.

On the other hand, when the command rotation speed (IVO$_N$) is different from the actual rotation speed (IVR), i.e. the actual rotation speed (IVR) is out of the predetermined range including the command rotation speed (IVO$_N$), the CPU 210 determines whether the command rotation speed (IVO$_N$) is higher than the actual rotation speed (IVR) (step 330). When the command rotation speed (IVO$_N$) is higher than the actual rotation speed (IVR), the rotation of the electric motor 230 is accelerated. Hence, the CPU 210 acquires the accelerated rate (INV$_{A\_N}$) by calculating INV$_{A\_N}$=(IVO$_N$−IVR)/IVO$_{INT}$ (step 340).

At the time of the acceleration, the rotation of the electric motor 230 is not decelerated. Hence, the CPU 210 sets the decelerated rate (INV$_{A\_N}$) at the present time (N=1) to be the same value as the decelerated rate (INV$_{D\_N-1}$) of the last time (N=0). Then, the calculation of the accelerated rate and the decelerated rate at the present time (N=1) is terminated.

When the CPU 210 determines that the command rotation speed (IVO$_N$) is lower than the actual rotation speed (IVR) (step 330), the rotation of the electric motor 230 is decelerated. Hence, the CPU 210 acquires the decelerated rate (INV$_{D\_N}$) by calculating INV$_{D\_N}$=(IVR−IVO$_N$)/IVO$_{INT}$ (step 350).

At the time of the deceleration, the rotation of the electric motor 230 is not accelerated. Hence, the CPU 210 sets the accelerated rate (INV$_{A\_N}$) at the present time (N=1) to be the same value as the accelerated rate (INV$_{A\_N-1}$) of the last time (N=0). Then, the calculation of the accelerated rate and the decelerated rate at the present time (N =1) is terminated.

Figure 3:
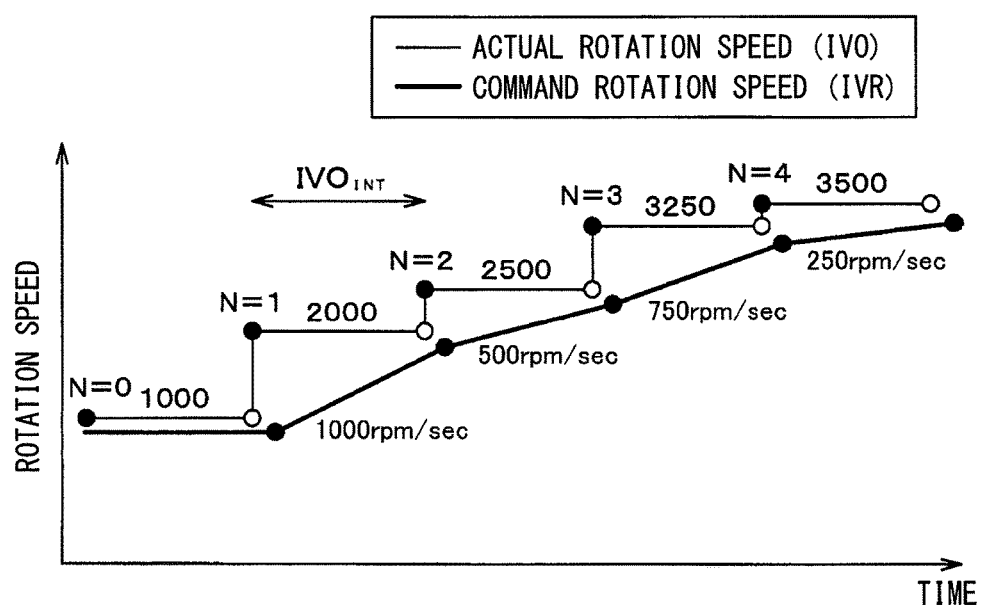
FIG. 3 is a diagram for explanation of change of the accelerated rate when rotation of the electric motor is accelerated, according to the first embodiment.

The CPU 210 calculates the accelerated rate and the decelerated rate by executing the process shown in FIG. 3 at each update interval successively, N=2, 3 . . . , The CPU 210 drives the inverter 220 to rotate the electric motor 230 at the calculated accelerated rate and the calculated decelerated rate.

For example, when the CPU 210 receives a command from the higher level ECU 100 to accelerate the rotation of the electric motor 230, the rotation speed changes as shown in FIG. 3. More specifically, at the present time (N=0), the electric motor 230 is assumed to rotate at 1000 rpm. Then, the CPU 210 receives the command rotation speed from the higher level ECU 100 to increase the rotation speed of the electric motor 230 to 2000 rpm in the next update interval (N=1).

When the update interval (IVO$_{INT}$) is defined as 1 second, for example, the CPU 210 calculates the accelerated rate to be 1000 rpm/sec as described above. The CPU 210 calculates the accelerated rate: (2000 rpm−1000 rpm)/1 sec=1000 rpm/sec. Therefore, the CPU 210 drives the inverter 220 such that the electric motor 230 rotates at the accelerated rate of 1000 rpm/sec from a start of the update interval of N=1 to an end of this update interval. Accordingly, the actual rotation speed of the electric motor 230 does not reach the command rotation speed before the end of the update interval, and the actual rotation speed of the electric motor 230 continues to change until the end of the update interval.

In FIG. 3, an acceleration start of the electric motor 230 is later than a start of the update interval. This is because of a processing time of the CPU 210 from receipt of the command rotation speed to driving of the inverter 220, which is about a few msec of time.

Subsequently, the command rotation speed is 2500 rpm in the update interval of N=2. Thus, the CPU 210 calculates the accelerated rate to be 500 rpm/sec. Therefore, the CPU 210 drives the inverter 220 such that the electric motor 230 rotates at the accelerated rate of 500 rpm/sec from a start of the update interval of N=2 to an end of this update interval.

Thereafter, the command rotation speed is 3250 rpm in the update interval of N=3, and the CPU 210 rotates the electric motor 230 at the calculated accelerated rate of 750 rpm/sec. The command rotation speed is 3500 rpm in the update interval of N=4, and the CPU 210 rotates the electric motor 230 at the calculated accelerated rate of 250 rpm/sec. Therefore, when the command rotation speed transmitted from the higher level ECU 100 to the CPU 210 successively increases, the actual rotation speed of the electric motor 230 continues to change in each update interval.

In the above-described example, the rotation of the electric motor 230 is accelerated. Thus, an appropriate accelerated rate is calculated in each update interval. In this case, the decelerated rate is set to be the same value before and after the update interval. Contrary to the example shown in FIG. 3, when the rotation of the electric motor 230 is decelerated, an appropriate decelerated rate is calculated in each update interval while the accelerated rate is set to be the same value before and after the update interval.

As described above, in the present embodiment, the CPU 210 calculates the accelerated rate and the decelerated rate appropriately and accelerates or decelerates the electric motor 230 smoothly in response to the command rotation speed that is updated by the higher level ECU 100 at every update intervals. Accordingly, when the command rotation speed of the electric motor 230 changes successively, the rotation speed of the electric motor 230 can be made to continue to change. In other words, constant-speed rotation of the electric motor 230 can be avoided, which is caused by the actual rotation speed of the electric motor 230 reaching the command rotation speed before an end of the update interval. Hence, alternation of acceleration or deceleration and constant-speed rotation of the electric motor 230 does not occur in successive update intervals, and thus a rotation sound of the electric motor 230 does not change like a musical scale. Therefore, generation of noise like a music scale from the electric motor 230 can be prevented.

The higher level ECU may be an example of an external device that acquires the command rotation speed of the electric motor control device 200 at predetermined update intervals. The CPU 210 may be an example of a controller that drives the inverter 220 based on the command rotation speed.

(Second Embodiment)

In a present embodiment, portions different from the first embodiment will be described. In the present embodiment, when the CPU 210 calculates the accelerated rate or the decelerated rate, these rates are multiplied by an adjusting fraction ($INV_{A\_RATE}$) less than 1. The adjusting fraction is, for example, 0.9.

Figure 4:
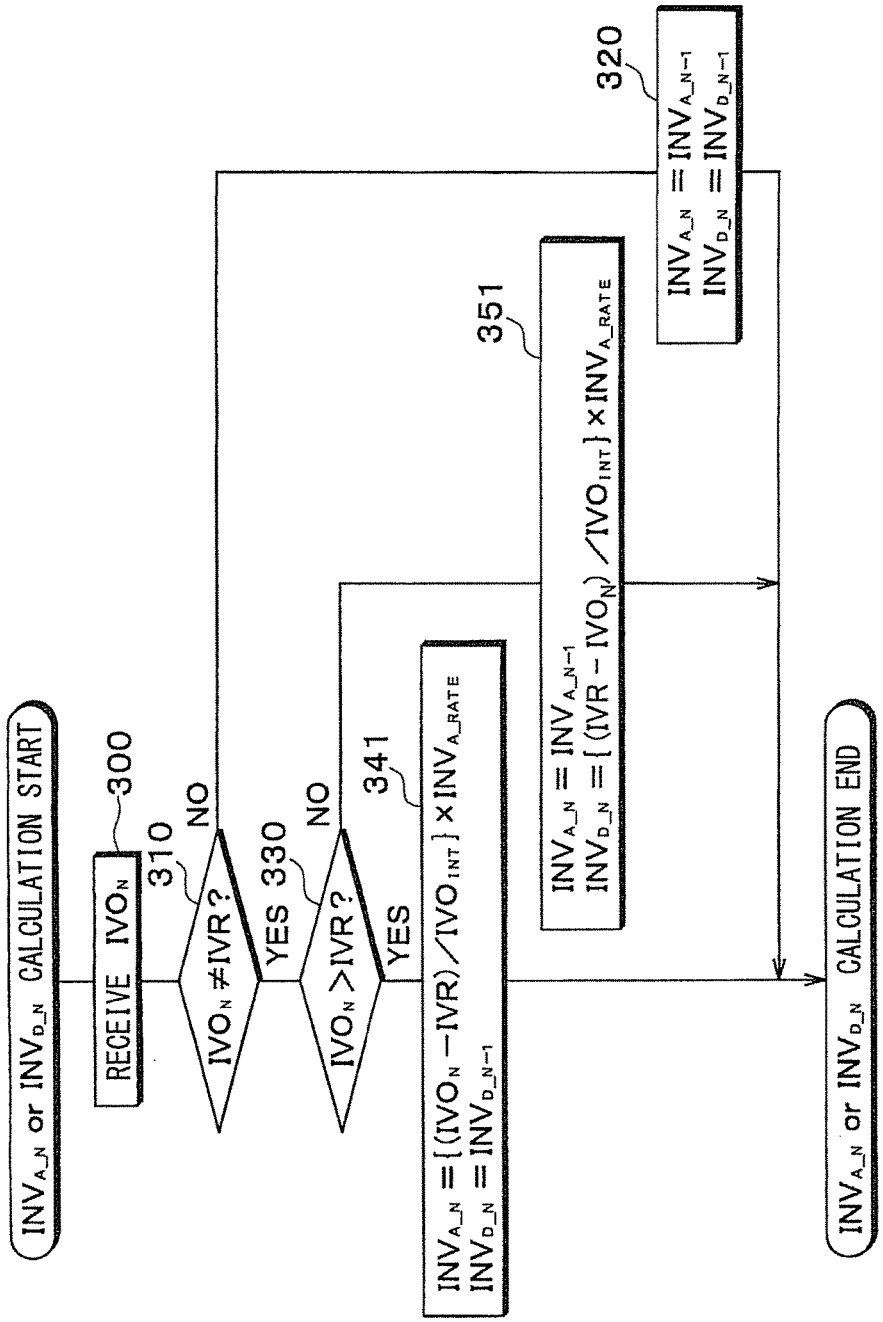
FIG. 4 is a flowchart showing a process for a CPU calculating an accelerated rate and a decelerated rate, according to a second embodiment of the present disclosure.

When the rotation of the electric motor 230 is accelerated, as shown in FIG. 4, the CPU 210 acquires the accelerated rate ($INV_{A\_N}$) by computing $INV_{A\_N} = \{(IVO_N - IVR)/IVO_{INT}\} \times INV_{A\_RATE}$ (step 341).

On the other hand, when the rotation of the electric motor 230 is decelerated, the CPU 210 acquires the decelerated rate ($INV_{D\_N}$) by computing $INV_{D\_N} = \{(IVR - IVO_N)/IVO_{INT}\} \times INV_{A\_RATE}$ (step 351).

The CPU 210 drives the inverter 220 such that the electric motor 230 rotates at the accelerated rate or the decelerated rate which have been adjusted by being multiplied by the adjusting fraction ($INV_{A\_RATE}$). Accordingly, the rate of change is calculated by using the adjusting fraction so as to be lower than a rate of change of the rotation speed at which the actual rotation speed reaches the command rotation speed at the end of the update interval. Therefore, the rotation speed controlled by the inverter 220 is slightly slower than that of the first embodiment.

As a result, even when the update interval of the command rotation speed the CPU 210 receives from the higher level ECU 100 is made to be longer than usual by a communication lag or the like, the actual rotation speed can be prevented from reaching the command rotation speed and becoming constant before the end of the update interval. Therefore, generation of noise can be prevented reliably.

The above-described adjusting fraction may be an example of an adjusting value that is used for reducing the rate of change.

(Third Embodiment)

In a present embodiment, portions different from the first and second embodiments will be described. In the present embodiment, when a calculated accelerated rate exceeds a predetermined value, the CPU 210 sets the accelerated rate as a predetermined upper limit and drives the inverter 220 to rotate the electric motor 230 at the upper limit accelerated rate. This is equally applied to the decelerated rate.

Figure 5:
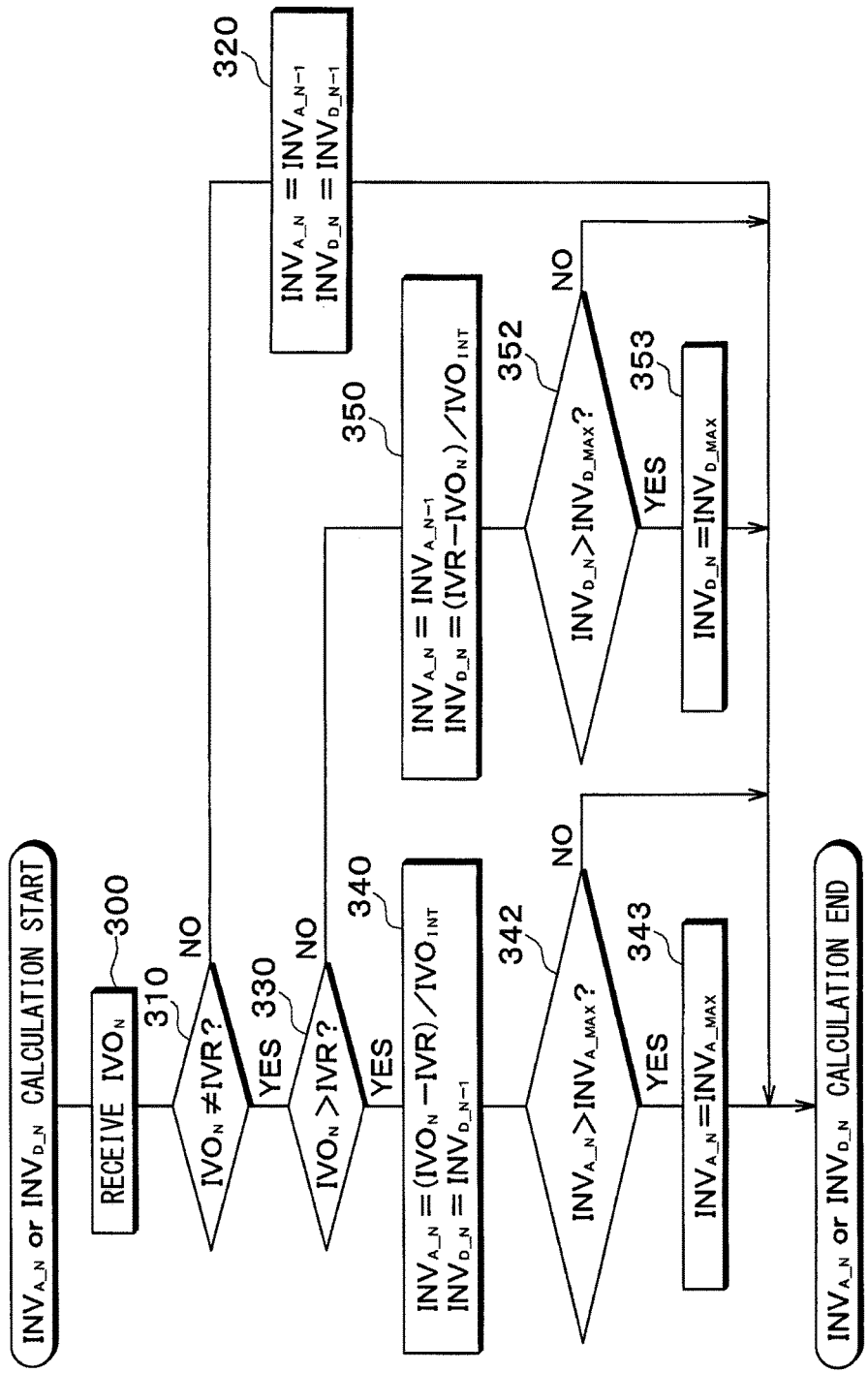
FIG. 5 is a flowchart showing a process for a CPU calculating an accelerated rate and a decelerated rate, according to a third embodiment of the present disclosure.

When the electric motor 230 is accelerated, as shown in FIG. 5, the CPU 210 calculates an accelerated rate ($INV_{A\_N}$), and then determines whether the accelerated rate ($INV_{A\_N}$) exceeds an upper limit ($INV_{A\_MAX}$) (step 342). When the accelerated rate ($INV_{A\_N}$) does not exceed the upper limit ($INV_{A\_MAX}$), the CPU 210 uses the calculated accelerated rate.

When the accelerated rate ($INV_{A\_N}$) exceeds the upper limit ($INV_{A\_MAX}$), the CPU 210 limits the accelerated rate ($INV_{A\_N}$) to the upper limit ($INV_{A\_MAX}$) (step 343). For example, when the calculated rate is 4000 rpm/sec and the upper limit is 2500 rpm/sec, the accelerated rate is limited to 2500 rpm/sec. Though the actual rotation speed of the electric motor 230 accordingly does not reach the command rotation speed until the end of the update interval, deterioration of noise caused by high-speed rotation of the electric motor 230 can be limited. Furthermore, the actual rotation speed of the electric motor 230 does not reach the command rotation speed and become constant before the end of the update interval. Thus, noise like a musical scale in successive update intervals does not occur. The actual rotation speed of the electric motor 230 changes without reaching the command rotation speed and becoming constant before the end of the update interval.

When the rotation of the electric motor 230 is decelerated, similarly, the CPU 210 calculates the decelerated rate ($INV_{D\_N}$), and then determines whether the decelerated rate ($INV_{D\_N}$) exceeds the upper limit ($INV_{D\_MAX}$) (step 352).

Similarly to the above, when the decelerated rate ($INV_{D\_N}$) does not exceed the upper limit ($INV_{D\_MAX}$), the CPU 210 uses the calculated decelerated rate. When the decelerated rate ($INV_{D\_N}$) exceeds the upper limit ($INV_{D\_MAX}$), the CPU 210 limits the decelerated rate ($INV_{D\_N}$) to upper limit ($INV_{D\_MAX}$) (step 353).

As described above, the CPU 210 executes a process to limit the rate to the upper limit depending on the calculated rate. Accordingly, the electric motor 230 can be rotated such that the actual rotation speed of the electric motor 230 follows the command rotation speed as much as possible, and noise caused by rotation of the electric motor 230 at a rate higher than a predetermined value can be limited.

(Fourth Embodiment)

Figure 6:
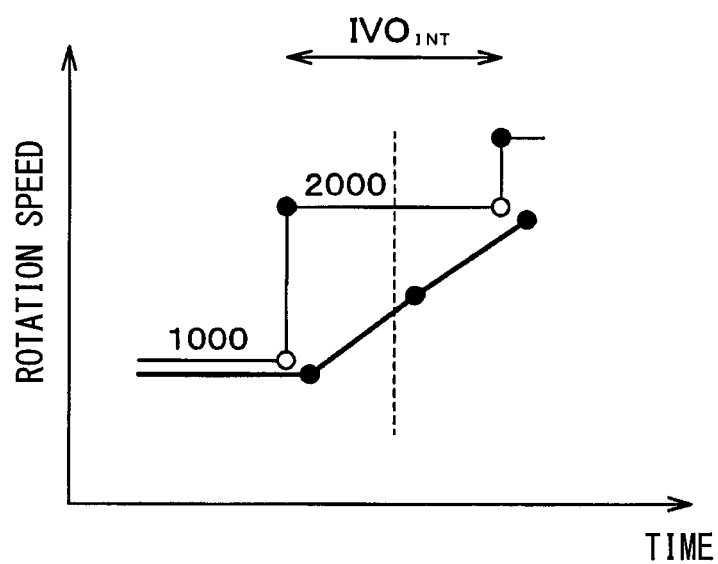
FIG. 6 is a diagram for explanation of a process for calculating an accelerated rate in each of two separated parts of an update interval, according to a fourth embodiment of the present disclosure.

In a present embodiment, portions different from the first to third embodiments will be described. In the present embodiment, the CPU 210 separates the update interval into multiple intervals, and calculates the accelerated rate and the decelerated rate every separated multiple intervals. For example, as shown in FIG. 6, a single update interval is separated into two parts. The CPU 210 calculates the accelerated rate and the decelerated rate in each of the separated intervals, and drives the inverter 220 in the respective intervals. The separation may not only be separation into two parts but also separation into three parts or more.

Accordingly, sound of rotation of the electric motor 230 can be varied more smoothly. Further, the accelerated rate can be set to be higher in an early phase of acceleration, and the accelerated rate can be set to be lower in a final phase of the acceleration. Therefore, the rotation of the electric motor 230 can be accelerated while performance reduction of the electric motor 230 is minimized.

(Fifth Embodiment)

In a present embodiment, a portion different from the second embodiment will be described. In the present embodiment, the CPU 210 further subtracts a rate adjusting amount ($INV_{A\_VOL}$) from the difference between the command rotation speed ($IVO_N$) and the actual rotation speed (IVR) in the calculations of the accelerated rate and the decelerated rate. The rate adjusting amount is, similar to the above-described adjusting fraction, a parameter for reducing the accelerated rate and the decelerated rate which are normally calculated.

It is preferable to set the rate adjusting amount in advance in accordance with the difference between the command rotation speed ($IVO_N$) and the actual rotation speed (IVR). When the rate adjusting amount is set at a fixed value, and the difference between the command rotation speed ($IVO_N$) and the actual rotation speed (IVR) is large, an effect to reduce the rate is decreased. When the difference between the command rotation speed ($IVO_N$) and the actual rotation speed (IVR) is small, the effect to reduce the rate is increased.

Figure 7:
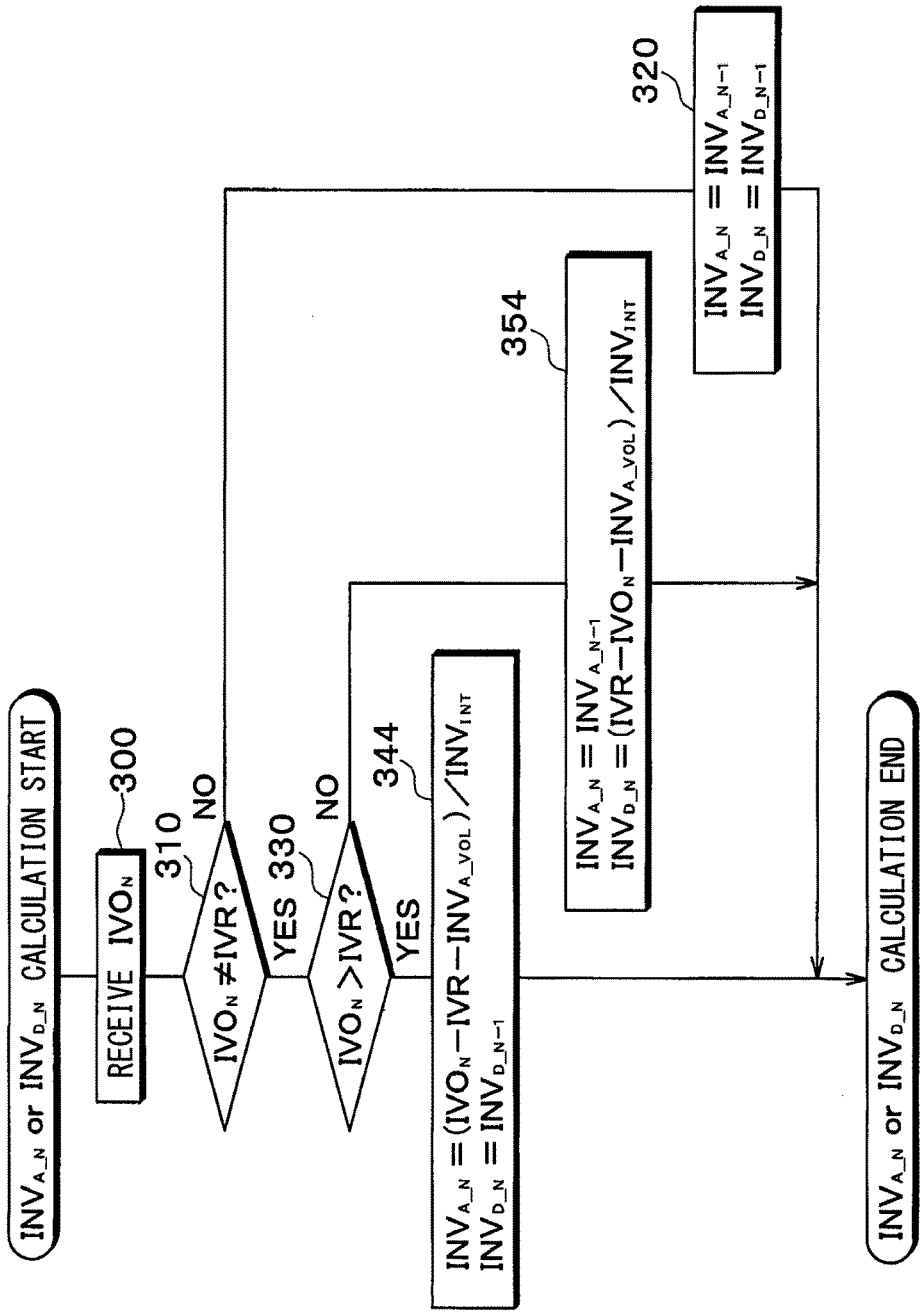
FIG. 7 is a flowchart showing a process for a CPU calculating an accelerated rate and a decelerated rate, according to a fifth embodiment of the present disclosure.

When the rotation of the electric motor 230 is accelerated, as shown in FIG. 7, the CPU 210 acquires the accelerated rate ($INV_{A\_N}$) by calculating $INV_{A\_N} = (IVO_N - IVR - INV_{A\_VOL})/IVO_{INT}$ (step 344).

When the rotation of the electric motor 230 is decelerated, the CPU 210 acquires the decelerated rate ($INV_{D\_N}$) by calculating $INV_{D\_N}=(IVR-IVO_N-INV_{A\_VOL})/IVO_{INT}$ (step 354).

The CPU 210 drives the inverter 220 such that the electric motor 230 rotates at the accelerated rate or the decelerated rate which has been calculated by using the rate adjusting amount ($INV_{A\_VOL}$). Accordingly, similar to the second embodiment, the actual rotation speed is prevented from reaching the command rotation speed and becoming constant before the end of the update interval.

The above-described rate adjusting amount may be used as an example of the adjusting value that is used for reducing the rate of change.

The configuration of the in-vehicle electric motor control device 200 shown in the above-described respective embodiments is an example, not limited to the configuration shown in the above descriptions, and may be made into another configuration that is capable of realizing the present disclosure. For example, the in-vehicle electric motor control device 200 shown in FIG. 1 is one example, and another configuration may be used instead.

The respective embodiments may be arbitrarily combined to control the CPU 210. For example, the process of multiplying by the adjusting fraction in the second embodiment may be combined with the process of separating the update interval and calculating each rate in the fourth embodiment. Accordingly, an influence of multiplying each rate by the adjusting fraction can be reduced, and the rotation sound of the electric motor 230 can be varied smoothly.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

The invention claimed is:

1. An in-vehicle electric control device comprising a controller acquiring a calculated command rotation speed from an external device at predetermined regular update intervals during the controller controlling an electric motor, wherein
   the controller rotates the electric motor by driving an inverter based on the command rotation speed,
   the controller calculates a rate of change of a rotation speed of the electric motor, and drives the inverter to rotate the electric motor at the rate of change of the rotation speed of the electric motor,
   the rate of change of the rotation speed of the electric motor is a parameter representing an increase or a decrease in the number of rotations during each of the predetermined regular update intervals,
   the controller acquires an actual rotation speed of the electric motor, and
   the controller calculates the rate of change of the rotation speed of the electric motor based on the predetermined regular update intervals and a speed difference between the actual rotation speed and the command rotation speed such that the rate of change of the rotation speed of the electric motor becomes lower than or equal to a constant rate obtained by dividing the speed difference by each of the predetermined regular update intervals.

2. The in-vehicle electric control device according to claim 1, wherein
   the controller calculates the rate of change of the rotation speed of the electric motor for each of the predetermined regular update intervals by use of an adjusting value such that the rate of change of the rotation speed of the electric motor becomes lower than the constant rate.

3. The in-vehicle electric control device according to claim 1, wherein
   the controller sets the rate of change of the rotation speed of the electric motor as an upper limit when the rate of change exceeds a predetermined value.

4. The in-vehicle electric control device according to claim 1, wherein
   the controller separates each of the predetermined regular update intervals into a plurality of intervals, and calculates the rate of change of the rotation speed of the electric motor with respect to each of the plurality of intervals.

5. The in-vehicle electric control device according to claim 1, wherein the command rotation speed increases in each successive interval of the predetermined regular update intervals.

6. The in-vehicle electric control device according to claim 5, wherein the rate of change of the rotation speed of the electric motor decreases in each successive interval of the predetermined regular update intervals.

* * * * *